(12) United States Patent
Bushman et al.

(10) Patent No.: US 9,425,737 B1
(45) Date of Patent: Aug. 23, 2016

(54) TAPPED INDUCTOR VOLTAGE CONTROLLED OSCILLATOR

(71) Applicant: Futurewei Technologies, Inc., Plano, TX (US)

(72) Inventors: Michael L. Bushman, Hanover Park, IL (US); Charles J. Duey, Westminster, CO (US); James W. Caldwell, Elgin, IL (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/659,244

(22) Filed: Mar. 16, 2015

(51) Int. Cl.
*H03B 5/12* (2006.01)

(52) U.S. Cl.
CPC ............ *H03B 5/1259* (2013.01); *H03B 5/1206* (2013.01)

(58) Field of Classification Search
CPC ........................... H03B 5/1259; H03B 5/1206
USPC ............................................ 331/117 FE, 181
See application file for complete search history.

(56) References Cited

U.S. PATENT DOCUMENTS

| | | | |
|---|---|---|---|
| 7,202,754 B2 * | 4/2007 | Komurasaki | H03B 5/1847 331/117 R |
| 2006/0033587 A1 | 2/2006 | Cabanillas | |
| 2014/0159825 A1 | 6/2014 | Samala et al. | |

FOREIGN PATENT DOCUMENTS

| | | |
|---|---|---|
| CN | 1889365 A | 1/2007 |
| CN | 101409530 A | 4/2009 |
| CN | 101867345 A | 10/2010 |

OTHER PUBLICATIONS

International Application Serial No. PCT/CN2016/076499, International Search Report mailed Jun. 1, 2016, 6 pgs.
International Application Serial No. PCT/CN2016/076499, Written Opinion mailed Jun. 1, 2016, 4 pgs.

* cited by examiner

*Primary Examiner* — Joseph Chang
(74) *Attorney, Agent, or Firm* — Schwegman Lundberg & Woessner, P.A.

(57) ABSTRACT

A voltage controlled oscillator includes a resonator and an amplifier. The resonator includes a capacitive element and an inductive element. The inductive element has a plurality of conductive segments forming a physical loop. The inductive element has electrical connections on the physical loop to the plurality of conductive segments forming at least one electrical loop disposed within an interior space formed by the physical loop. The amplifier has an input and an output, the input coupled to a first conductive segment forming a first impedance and the output coupled to a second conductive segment forming a second impedance.

22 Claims, 8 Drawing Sheets

TAPPED INDUCTOR VOLTAGE CONTROLLED OSCILLATOR

TECHNICAL FIELD

This disclosure is generally directed to voltage controlled oscillators (VCOs) and more particularly to a VCO employing an integrated tapped inductor with a novel topology and layout to improve noise performance and reduce power consumption.

BACKGROUND

With the growth of wireless communication systems such as cellular, wireless local area networks (WLAN), satellite communications, the global positioning system (GPS), and the like, demands for smaller size, lower cost, and higher frequency products have continuously increased. In this regard, voltage controlled oscillators (VCOs) play a critical role in communication systems, providing periodic signals required for timing in digital circuits and frequency translation in radio frequency (RF) circuits. A VCO may be embodied as a stand-alone module separate from other circuits or integrated into an application specific integrated circuit (ASIC), for use in devices such as, but not limited to, handsets, base stations, and virtually every communication device. As RF frequencies increase and supply voltages decrease, it has become increasingly more difficult to design VCOs that meet system noise and power requirements while meeting the demands for smaller size, lower cost, and higher frequency products.

The noise performance of a LC resonant VCO is directly related to its signal power, which is proportional to the energy stored in the resonant inductor-capacitor (LC) tank circuit. In traditional VCO designs, the energy stored in the LC circuit is proportional to the size of the inductor and the square of the supply voltage for the amplifier in the VCO.

As semiconductor device geometries shrink, the supply voltage for the amplifier is required to decrease to avoid hot carrier injection (HCI). HCI is a phenomenon wherein charge carriers become trapped in the gate dielectric of a MOS transistor and permanently change its switching characteristics.

To compensate for the decrease in voltage, the inductor used in the LC tank circuit must also decrease in size so that the resulting noise performance of the VCO remains the same. Increases in required frequency also require the inductor size to be decreased. The decrease in inductor size presents a challenge since as an inductor gets smaller in size, its quality factor (Q) decreases as well, further increasing the thermal noise of the VCO.

A so-called Hartley VCO is an active circuit comprising an amplifier, capacitor(s), and inductors. A characteristic of the Hartley VCO is a tuned circuit comprising capacitor(s) in parallel with two or more inductors in series, and a feedback signal for oscillation taken from a connection in between the inductors.

Referring now to FIG. 1, a schematic is illustrated of a prior art differential Harley VCO 100 employing a conventional LC tank circuit resonator. Transistors M1-M4 form an amplifier. PMOS transistors M3 and M4 have their sources coupled to the positive supply rail (e.g. VDD), and their respective gates cross coupled to the drains of the opposing PMOS transistor and to the sources of PMOS transistors M1 and M2, respectively. PMOS transistors M1 and M2 have their drains coupled to the negative supply rail (e.g. ground), and their respective gates coupled to the conventional LC tank resonator formed with inductors L1 and L2 and capacitors $C_v$.

FIG. 2 illustrates a prior art layout for tapped inductors L1 and L2 schematically depicted in FIG. 1. In FIG. 2, the inductors L1 and L2 are shown as nested loops 201-202. The nesting provides the mutual couplings k1 and k2 shown in FIG. 1.

FIG. 3A illustrates a schematic diagram of a prior art simplified differential Harley VCO circuit employing a conventional LC tank circuit resonator. FIG. 3B illustrates a simplified schematic diagram of the small signal half circuit resonator of the circuit in FIG. 3A.

FIG. 4 illustrates an integrated circuit die for the circuit depicted in FIGS. 3A and 3B including the prior art layout for the tapped inductors. In FIG. 4, the inductor elements L1 and L2 are shown as nested loops 401-402. The nesting provides the mutual coupling K shown in FIG. 3A. Inductive elements L3 and L4 in FIG. 3A are shown as separate loops 403-404 in FIG. 4.

In the prior art layouts depicted in FIG. 2 or 4, separate loops (e.g., loops 201-202 and loops 401-402) are utilized for inductances L1 and L2. These separate loops put physical limits on how small an inductor element can be used in a Hartley VCO design. For example, because of the inductor topology, the minimum to maximum frequency range of the VCO circuits depicted in FIGS. 1 and 3 is on the order of ten to fifteen percent due to the parasitic capacitance associated with the large physical inductances.

SUMMARY

According to an embodiment of the present disclosure, a voltage controlled oscillator (VCO) includes a resonator and an amplifier. The resonator includes a capacitive element and an inductive element, the inductive element having a plurality of conductive segments forming a physical loop. The inductive element has electrical connections on the physical loop to the plurality of conductive segments forming at least one electrical loop disposed within an interior space formed by the physical loop. The amplifier has an input and an output, the input coupled to a first conductive segment forming a first impedance and the output coupled to a second conductive segment forming a second impedance.

According to another embodiment of the present disclosure, a non-transitory computer-readable medium is disclosed for use with a computer having software for creating integrated circuits. The computer-readable medium has stored thereon one or more computer-readable data structures having photomask data for making a voltage controlled oscillator. The voltage controlled oscillator includes a resonator and an amplifier. The resonator includes a capacitive element and an inductive element, the inductive element having a plurality of conductive segments forming a physical loop. The inductive element has electrical connections on the physical loop to the plurality of conductive segments forming at least one electrical loop disposed within an interior space formed by the physical loop. The amplifier has an input and an output, the input coupled to a first conductive segment forming a first impedance and the output coupled to a second conductive segment forming a second impedance.

The present disclosure provides a VCO with reduced current, lower noise, higher Q at higher frequencies, and better linearity.

DETAILED DESCRIPTION

The construction and practice of various embodiments are discussed in detail below. It should be appreciated, however, that the present disclosure provides many applicable inventive concepts that can be embodied in a wide variety of specific contexts. Though specific embodiments discussed herein are merely illustrative of specific ways to make and practice the teachings and technology herein, they do not limit the scope of this disclosure.

Unless defined otherwise, all technical and scientific terms used herein have the same meaning as commonly understood by those of skill in the art to which this disclosure pertains.

Various circuits or other components may be described or claimed as "configured to" perform a task or tasks. In such contexts, "configured to" is used to connote structure by indicating that the circuits/components include structure (e.g., circuitry) that performs the task or tasks during operation. As such, the circuit/component can be said to be configured to perform the task even when the specified circuit/component is not currently operational (e.g., is not on). The circuits/components used with the "configured to" language include hardware—for example, circuits to implement the operation, etc. Reciting that a circuit/component is "configured to" perform one or more tasks is expressly intended not to invoke 35 U.S.C. 112 (f).

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Figure 1:
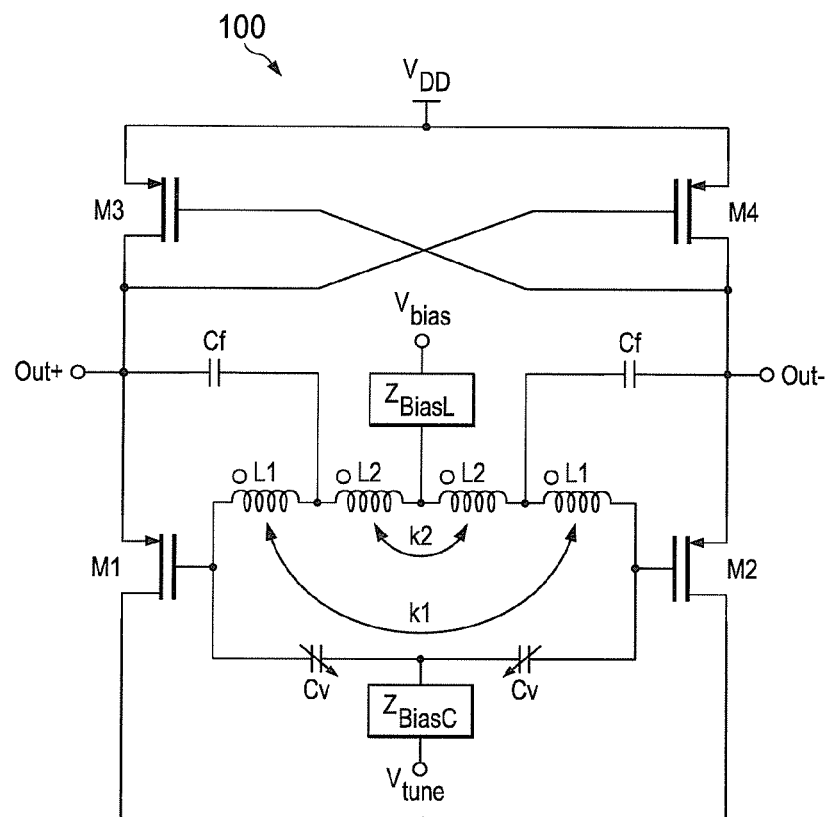
FIG. 1 illustrates a schematic of a prior art differential Harley VCO circuit employing a conventional LC tank circuit resonator.
Figure 2:
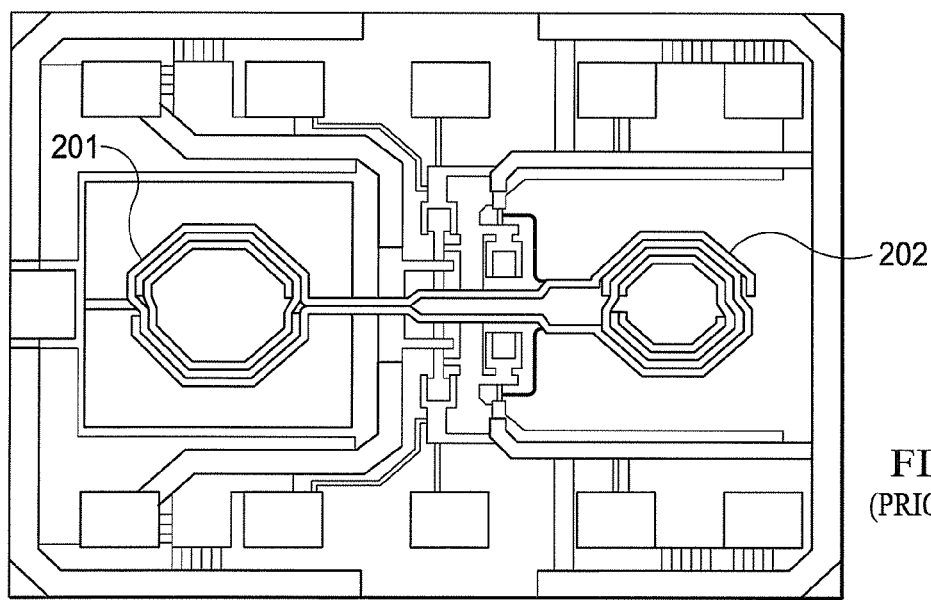
FIG. 2 illustrates an integrated circuit die for the circuit depicted in FIG. 1 including the prior art layout for the tapped inductors.
Figure 3A:
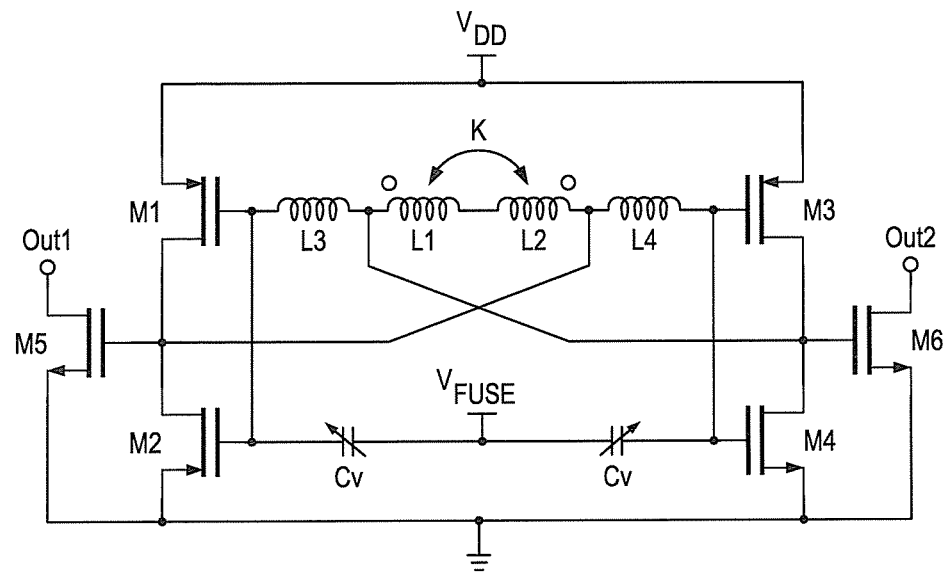
FIG. 3A illustrates a schematic of a prior art simplified differential Harley VCO circuit employing a conventional LC tank circuit resonator and FIG. 3B illustrates the small signal half circuit resonator of the circuit in FIG. 3A.
Figure 3B:
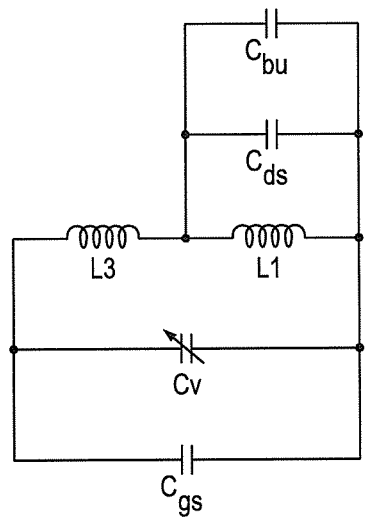
Figure 4:
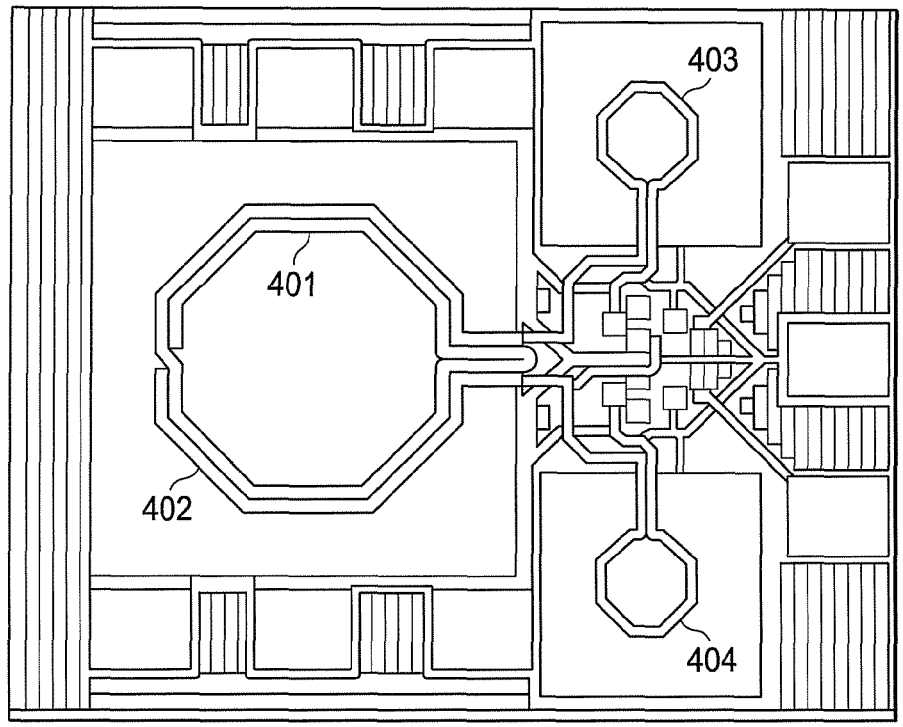
FIG. 4 illustrates an integrated circuit die for the circuit depicted in FIGS. 3A and 3B including the prior art layout for the tapped inductors.
Figure 5:
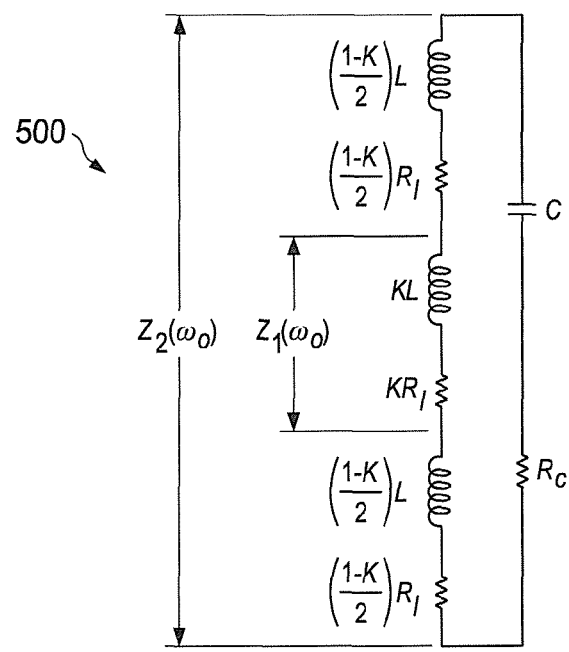
FIG. 5 illustrates a schematic of a differential LC resonant circuit including parasitic resistance for use in a differential VCO.

Turning now to FIG. 5, a schematic of an LC resonant circuit 500 including parasitic resistances $R_c$ and $R_1$ is illustrated for use in a differential VCO. The VCO amplifier supplies a current to the input impedance of the LC circuit 500 that produces a voltage across the LC circuit equal to the voltage at the input of the amplifier. In a traditional single inductor VCO (e.g., a Pierce configuration), the amplifier drives the impedance $Z_2(\omega_o)$ and the voltage at the input of the amplifier is that indicated as being across $Z_2(\omega_o)$.

In the present disclosure, a single inductor is tapped (e.g., divided into at least two parts) in a manner described by a coefficient K. The amplifier drives the inductor tap defined by impedance $Z_1(\omega_o)$ while the voltage at the input of the amplifier is from a signal across the inductor tap defined by impedance $Z_2(\omega_o)$. Theoretically, inductor segments KL and (1−K)/2*L can be viewed as separate inductors for small inductances and very high frequencies. However, separate inductors are impractical due to the physical size requirements and mutual coupling.

Since the input and the output of the amplifier are at different points in the LC circuit (i.e. $Z_2$ and $Z_1$), the input voltage to the amplifier in the VCO can be much larger than its output voltage as determined by the voltage divider action of the tapped inductor. There are a number of advantages to this arrangement.

The HCI voltage limitations of the amplifier are constrained to the output. This allows the input signal to exceed the supply voltage restrictions of the amplifier. Since the input voltage is representative of the energy stored in the LC circuit, the VCO noise is lower for the same total inductance than a VCO with a traditional resonator because the LC circuit voltage is higher. Moreover, the inductor does not have to decrease in size to meet noise requirements allowing for a higher inductor Q when integrated onto an integrated circuit, such as, for example, as part of an ASIC.

Since the input voltage to the amplifier exceeds the power supply rails, the gain of the amplifier is higher for a given power consumption. The output current of the amplifier is the product of the input voltage across $Z_2$ and its transconductance $g_m$. Since the input voltage is increased, the amplifier has more gain for the same current. This reduces the power requirements for the system.

As can be seen from FIG. 5 and equations (1)-(5) below, the impedance of the LC circuit at $Z_1(\omega_o)$ is lower than the impedance $Z_2(\omega_o)$ by a factor of $K^2$. The linearity of the amplifier under large signal conditions is dominated by the linearity at its output rather than its input. Having a lower impedance at the output of the VCO reduces the non-linear mixing of flicker noise to the VCO frequency thus improving its close-in sideband noise spectrum. Those skilled in the art will recognize that flicker noise at baseband frequencies is a type of electronic noise with a $1/\omega$ density spectrum but once mixed by nonlinear elements, produces a $1/\omega^3$ portion of the VCO single side band phase noise.

$$\text{At resonance } \omega_o^2 = \frac{1}{LC} \text{ and } \omega_o L = X_o \quad (1)$$

$$\text{Re}\{Z_1(\omega_o)\} = \frac{KR_l[(1-K)R_l + R_c]}{R_l + R_c} + \frac{(K\omega_o L)^2}{R_l + R_c} \quad (2)$$

$$\text{Re}\{Z_1(\omega_o)\} \approx K^2 \left[ \frac{X_0^2}{R_l + R_c} \right] \quad (3)$$

$$\text{Re}\{Z_2(\omega_o)\} = \frac{R_l R_c}{R_l + R_c} + \frac{(\omega_o L)^2}{R_l + R_c} \quad (4)$$

$$\text{Re}\{Z_2(\omega_o)\} \approx \left[ \frac{X_0^2}{R_l + R_c} \right] \quad (5)$$

Where: $\omega_o$ is the oscillation frequency (rad/s),
L is the inductance,
C is the capacitance,
$R_l$ is the parasitic resistance of the inductor,
$R_c$ is the parasitic resistance of the capacitor,
K is a constant relating $Z_1$ to $Z_2$,
$X_o$ is the reactance of inductor L at the resonant frequency $\omega_o$.

Figure 6:
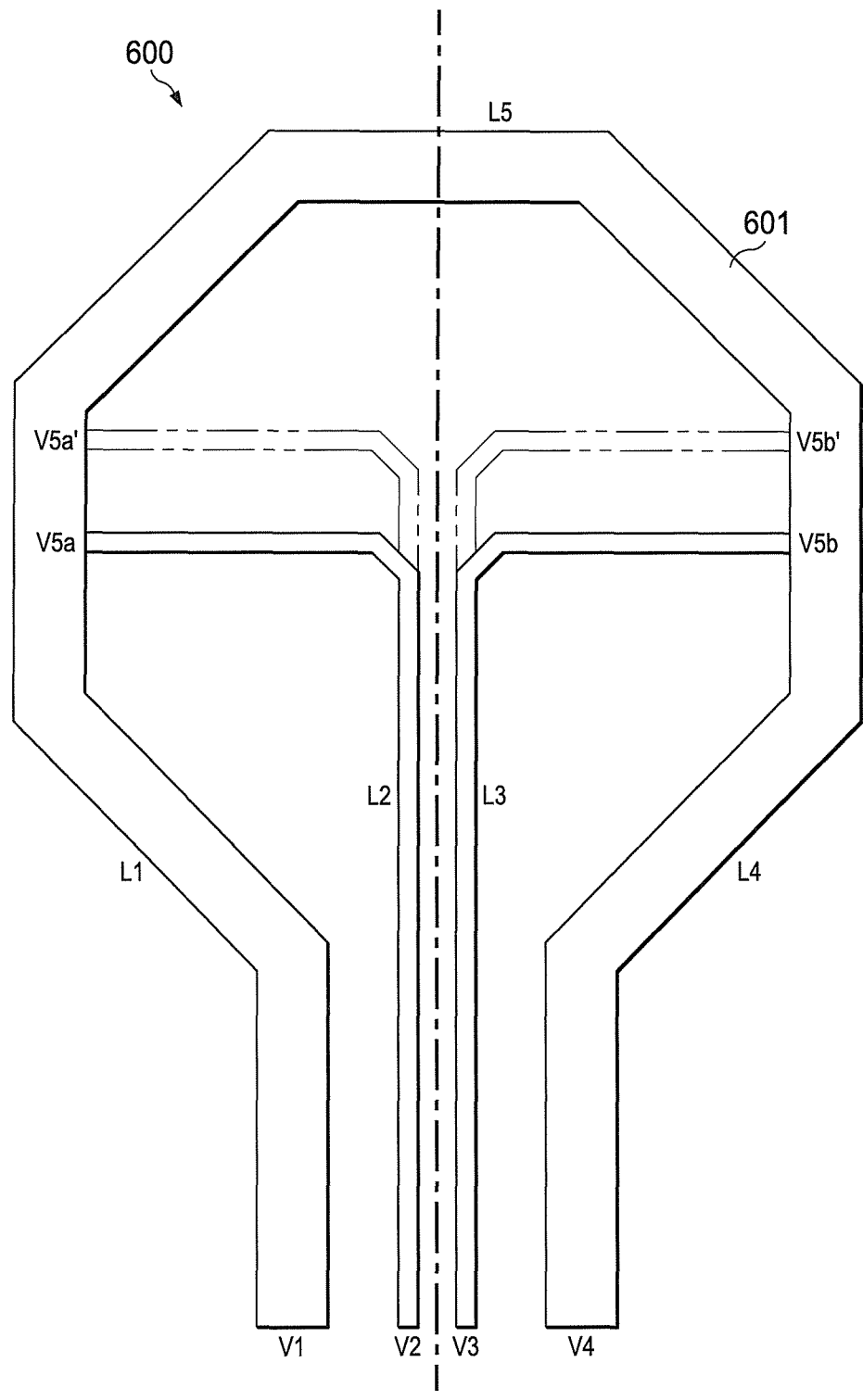
FIG. 6 illustrates an example layout for a differential tapped inductor for use in an LC tank circuit and for integration onto an integrated circuit in accordance with principles of the present invention.
Figure 7:
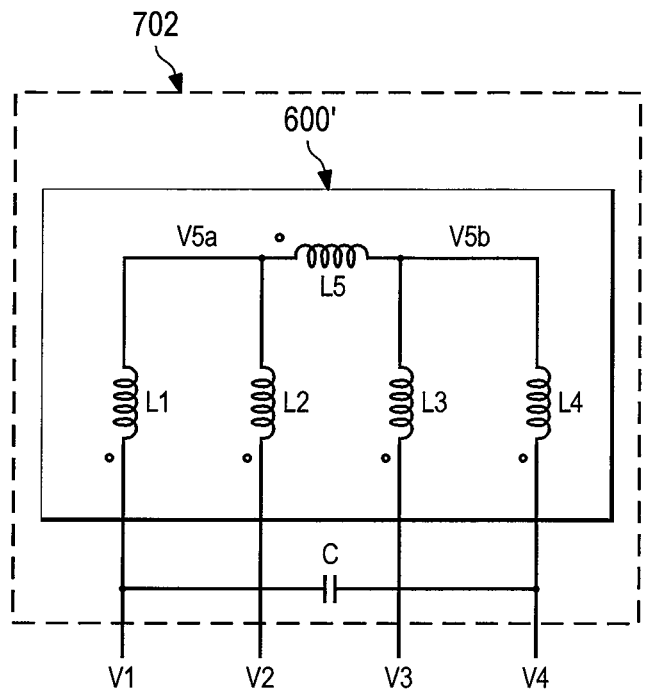
FIG. 7 illustrates a differential LC tank circuit resonator including a schematic representation of the equivalent inductances of the tapped inductor of FIG. 6 coupled in parallel with a capacitor, in accordance with principles of the present disclosure.

Reference is now made to FIG. 6 that illustrates an example layout for a differential tapped inductor 600 for use in an LC tank circuit (such as that shown in FIG. 5) and for integration onto an integrated circuit in accordance with principles of the present invention. FIG. 7 illustrates an ideal schematic of a differential LC tank circuit resonator 702 including representation of the equivalent inductances 600' of the tapped inductor 600 in FIG. 6 coupled in parallel with a capacitor C. Note that the segments V1-V5a, V2-V5a, V3-V5b, V4-V5b, and V5a-V5b in FIG. 6 correspond to inductors L1, L2, L3, L4, and L5 in the schematic of FIG. 7, respectively.

The differential tapped inductor 600 comprises one or more conductive segments (e.g. V1-V5a, V4-V5b, and V5a-V5b) forming a physical loop 601. As used herein, the term "physical loop" refers to a closed or nearly closed geometric shape having beginning and ending points that are co-located or in close proximity to each other, and that includes at least one substantially convex portion that defines an interior space within the convex portion (e.g., a cyclic polygon or cyclic polygon segment). Thus, a physical loop is to be distinguished from an "electrical loop" which typically represents a closed path of any shape through which electrical current may flow.

The physical loop 601 is preferably symmetrical and, in the case of the inductor 600, is depicted as a generally octagonal shape. Those skilled in the art will recognize that the physical loop 601 may include other symmetrical and non-symmetrical shapes without departing from the scope of the present disclosure (e.g., a rectangle, square, hexagon, etc.). The inductor 600 is tapped with electrical connections at V5a and V5b with segments V2-V5a and V3-V5b forming electrical loops (L2 and L3) disposed within the interior space formed by the physical loop 601 (including L1, L5, and L4).

The capacitive element C of resonator 702 may be embodied as a PMOS varactor, an NMOS varactor, a metal-insulator-metal (MIM) device, or any other suitable capacitance element. In a silicon process, two types of varactors may be employed namely, a reversed-bias pn junction diode or a MOS capacitor varactor. The MOS capacitor varactor may be formed with a MOS transistor having its drain, source, and bulk connections coupled together and adjusting the capacitance based on the voltage applied between the bulk and the gate connections. Those skilled in the art will recognize other alternatives for the capacitive element C of the resonator 702 without departing from the scope of the present disclosure.

The quality factor (Q) for the resonant LC tank circuit 702 is dependent on the inductor 600 having low resistance. The resistance of the inductor 600 is minimized by using a thick/wide metallization process such as, but not limited to, aluminum, copper, gold, or other appropriate material to reduce the series resistance. The inductor 600 is preferably formed over a high dielectric substrate material such as silicon, gallium arsenide, or other appropriate material. Surface micro-machining technologies may be employed to create an air gap between the inductor and the substrate to further increase the dielectric property.

The inductor tap segments V2-V5a and V3-V5b (L2 and L3) which are coupled to the amplifier output and are not part of the LC resonant circuit. Accordingly, their parasitic resistances are not as critical as the parasitic resistances of inductor segments of L1, L4, and L5. Thus, L2 and L3 segments may be constructed with a thinner metal material as depicted in FIG. 6.

A practical problem associated with using multiple inductors (e.g. L1-L5) is the mutual inductance in any connection from the amplifier output to the tap points V5a and V5b. The inductor current in the resonant LC circuit is typically much higher than the current supplied from the amplifier by a factor of the circuit Q. When the mutual inductance is high, the induced current from the resonant LC circuit becomes high enough in the leads from the amplifier output to the tap point that the input impedance to the tap becomes so high that the amplifier cannot supply any current. To overcome this issue, tap segments V2-V5a (L2) and V3-V5b (L3) are routed up the middle of the inductor 600 (as depicted in FIG. 6) so that the induced currents from the symmetric halves of the inductor 600 cancel.

Tap locations V5a and V5b can be adjusted in metal to vary the power consumption, VCO output swing, and phase noise performance. This can be used to fine tune a design held at metal such as depicted by V5a' and V5b'. To minimize the parasitic effects of the substrate, the substrate may be doped to have a high resistivity and/or the distance between the metal layer and the substrate may be increased through etching or micro-machining.

Figure 8:
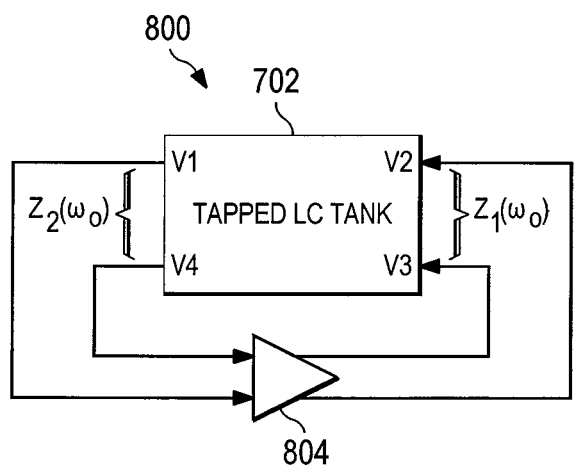
FIG. 8 illustrates a block diagram of a differential VCO practiced in accordance with principles of the present disclosure.

FIG. 8 illustrates a block diagram of a differential VCO 800 practiced in accordance with principles of the present disclosure. The tapped LC tank circuit 702 (illustrated in detail in FIG. 7) has terminals V1, V2, V3, and V4. Terminals V1 and V4 are coupled to the input of amplifier 804 and terminals V2 and V3 are coupled to the output of amplifier 804. Amplifier 804 preferably has a CMOS topology however those skilled in the art will recognize other suitable amplifier topologies such as PMOS, NMOS and bipolar, without departing from the scope of the present disclosure.

Figure 9:
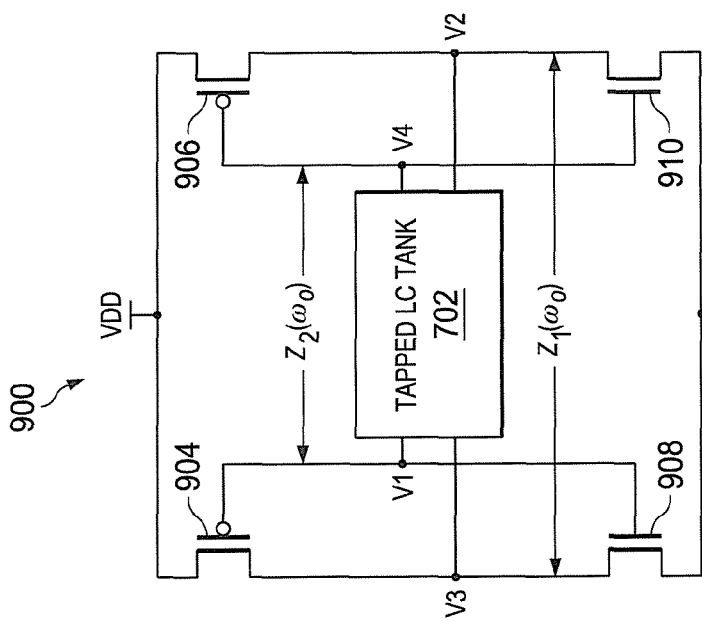
FIG. 9 illustrates a schematic of an example differential VCO employing an amplifier having a CMOS topology and a resonator practiced in accordance with the principles of the present disclosure.

Referring to FIG. 9, a schematic is illustrated of an example differential CMOS VCO 900 employing a LC tank resonator circuit 702 practiced in accordance with the principles of the present disclosure. A CMOS amplifier is formed with PMOS transistors 904 and 906 and NMOS transistors 908 and 910. The PMOS transistors 904 and 906 have their sources coupled to the positive supply rail (VDD) and their gates coupled to the gates of NMOS transistors 908 and 910, respectively. The gates of PMOS transistor 904 and NMOS transistor 908 are coupled to the V1 tap of differential tapped LC tank circuit 702. The gates of PMOS transistor 906 and NMOS transistor 910 are coupled to the V4 tap of differential tapped LC tank circuit 702. The NMOS transistors 908 and 910 have their sources coupled to the negative supply rail (ground) and their respective drains coupled to the drains of PMOS transistors 904 and 906, respectively.

The V3 and V4 taps of the LC tank resonator circuit 702 are coupled to the commonly coupled drains of PMOS transistor 904 and NMOS transistor 908 and commonly coupled drains of PMOS transistor 906 and NMOS transistor 910, respectively.

Figure 10:
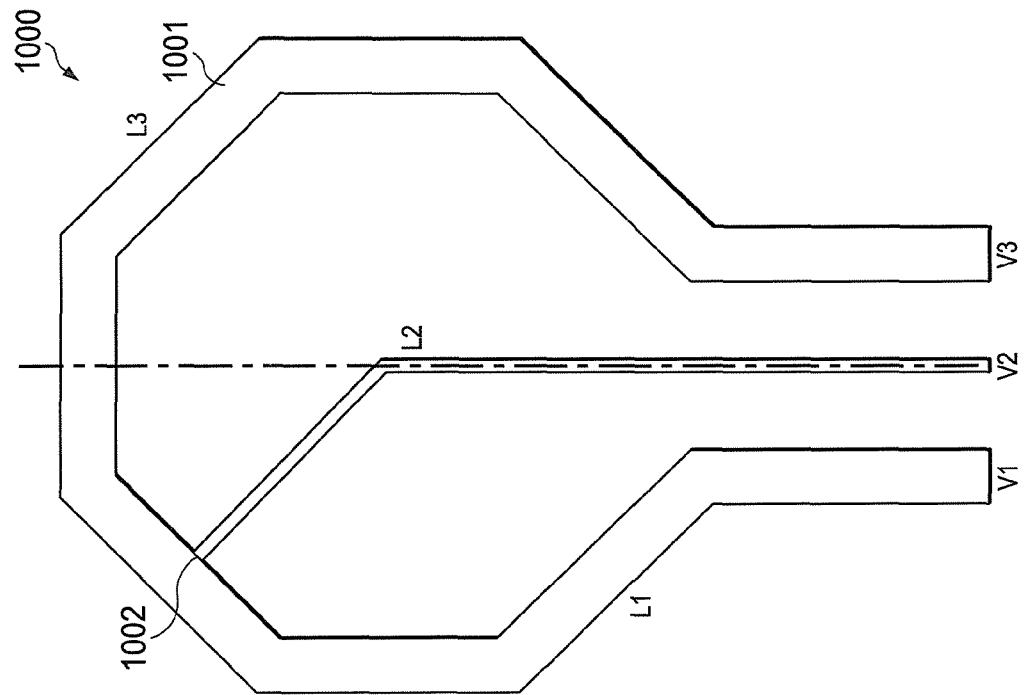
FIG. 10 illustrates an example layout for a single ended tapped inductor for use in an LC tank circuit and for integration onto an integrated circuit in accordance with principles of the present invention.
Figure 11:
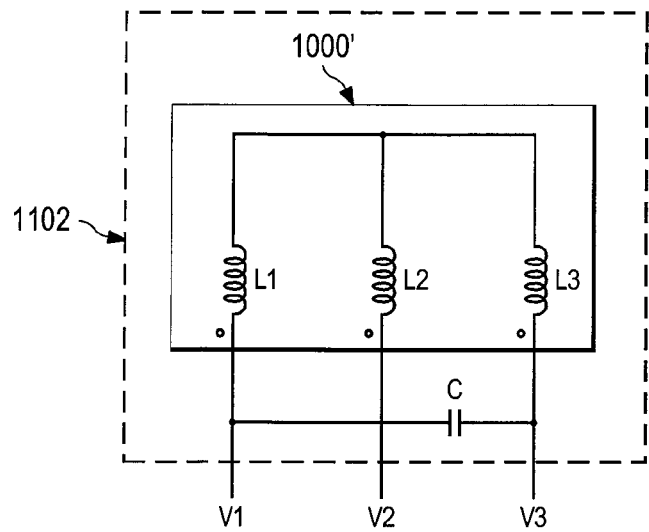
FIG. 11 illustrates a single ended LC tank circuit resonator including a schematic representation of the equivalent inductances of the tapped inductor in FIG. 10 coupled in parallel with a capacitor.

Referring now to FIG. 10, an example layout is illustrated for a single ended tapped inductor 1000 for use in an LC tank circuit and for integration onto an integrated circuit in accordance with principles of the present invention. The single ended tapped inductor 1000 comprises one or more conductive segments (e.g. V1-1002 and 1002-V3) forming a physical loop 1001. The physical loop 1001 is preferably symmetrical and is depicted in a generally octagonal shape. Those skilled in the art will recognize other symmetrical and non-symmetrical shapes for the physical loop 1001 without departing from the scope of the present disclosure. The inductor 1000 is tapped with at least one electrical connection (e.g., 1002) with a segment 1002-V2 disposed within the interior of the physical loop 1001. FIG. 11 illustrates a schematic of an ideal single ended LC tank circuit resonator 1102 including a representation of the equivalent inductances of the tapped inductor 1000 in FIG. 10 coupled in parallel with a capacitor C.

The capacitive element C of resonator 1102 may be embodied as a PMOS varactor, an NMOS varactor, a metal-insulator-metal (MIM) device, or any other suitable capacitance element. In a silicon process, two types of varactors may be employed namely, a reversed-bias pn junction diode or a MOS capacitor varactor. The MOS capacitor varactor may be formed with a MOS transistor having its drain, source, and bulk connections coupled together and adjusting the capacitance based on the voltage applied between the bulk and the gate connections. Those skilled in the art will recognize other alternatives for the capacitive element C of the resonator 1102 without departing from the scope of the present disclosure.

The quality factor (Q) for the resonant LC tank circuit 1102 is dependent on the inductor 1000 having low resistance. The resistance of the inductor is minimized by using a thick/wide metallization process such as, but not limited to, aluminum, copper, or other appropriate material to reduce the series resistance. The inductor 1000 is preferably formed over a high dielectric substrate material such as silicon, gallium arsenide, or other appropriate material. Surface micro-machining technologies may be employed to create an air gap between the inductor and the substrate to further increase the dielectric property.

The inductor tap segment L2 which is coupled to the amplifier output is not part of the LC resonant circuit. Accordingly, its parasitic resistance is not as critical as the parasitic resistances of inductor segments of L1 and L3. Thus, the L2 segment may be constructed with a thinner metal material as depicted in FIG. 10.

Figure 12:
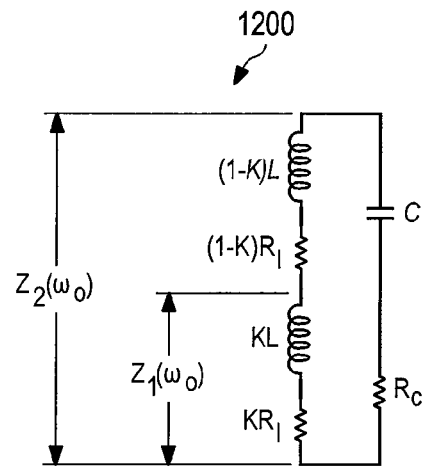
FIG. 12 illustrates a schematic of a single ended LC resonant circuit including parasitic resistance for use in a single ended VCO.

Turning now FIG. 12, a schematic is illustrated of a single ended LC resonant circuit 1200 including parasitic resistances $R_c$ and $R_1$ for use in a single ended VCO. A single ended VCO amplifier supplies a current to the input impedance of the LC circuit 1200 which produces a voltage across the LC circuit equal to the voltage at the input of the amplifier. In a traditional single ended VCO, the amplifier drives the impedance $Z_2(\omega_o)$ and the voltage at the input of the amplifier is that indicated as being across $Z_2(\omega_o)$.

In the present disclosure, the inductor is tapped (e.g. divided into at least two parts) described by a coefficient K. The amplifier drives the inductor tap defined by impedance $Z_1(\omega_o)$ while the voltage at the input of the amplifier is from a signal across the inductor tap defined by impedance $Z_2(\omega_o)$. Theoretically, inductor segments KL and (1−K)L can be viewed as separate inductors for small inductances and very high frequencies. However, separate inductors are impractical due to the physical size requirements and mutual coupling.

Since the input and the output of the amplifier are at different points in the LC circuit (i.e. $Z_2$ and $Z_1$), the input voltage to the amplifier in the VCO can be much larger than its output voltage as determined by the voltage divider action of the tapped inductor.

Figure 13:
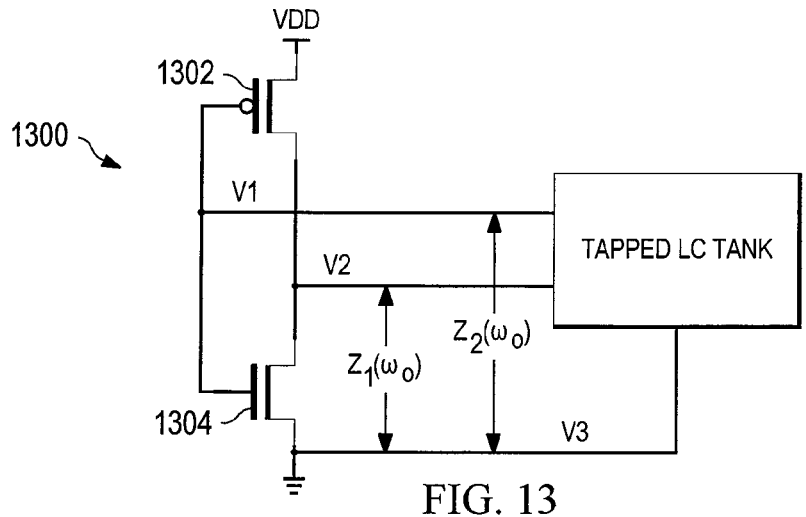
FIG. 13 illustrates a schematic of an example single ended VCO employing an amplifier having a CMOS topology and a resonator practiced in accordance with the principles of the present disclosure.

Turning now to FIG. 13, a schematic is illustrated of an example single ended VCO 1300 employing an amplifier having a CMOS topology and a resonator 1102 practiced in accordance with the principles of the present disclosure. A CMOS amplifier is formed with PMOS transistor 1302 and NMOS transistor 1304. PMOS transistor 1302 has its source coupled to the positive supply rail (VDD) and its gate coupled to the gate of NMOS transistor 1304 and to the V1 tap of single ended tapped LC tank circuit 1102. The NMOS transistor 1304 has its source coupled to the negative supply rail (ground) and its drain coupled to the drain of PMOS transistor 1304 and to the V2 tap of single ended tapped LC tank circuit 1102. The V3 tap of the single ended tapped LC tank circuit 1102 is coupled to the negative supply rail (ground).

While the circuit in FIG. 13 preferably has a CMOS topology, those skilled in the art will recognize other suitable amplifier topologies such as PMOS, NMOS and bipolar, without departing from the scope of the present disclosure.

Modern integrated circuit design and manufacturing are commonly automated with Electronic Design Automation (EDA) tools. Example tools may be found from companies such as, but not limited to, Synopsys, Cadence, and Mentor Graphics. The details of these EDA tools are not required for the present disclosure.

Figure 14:
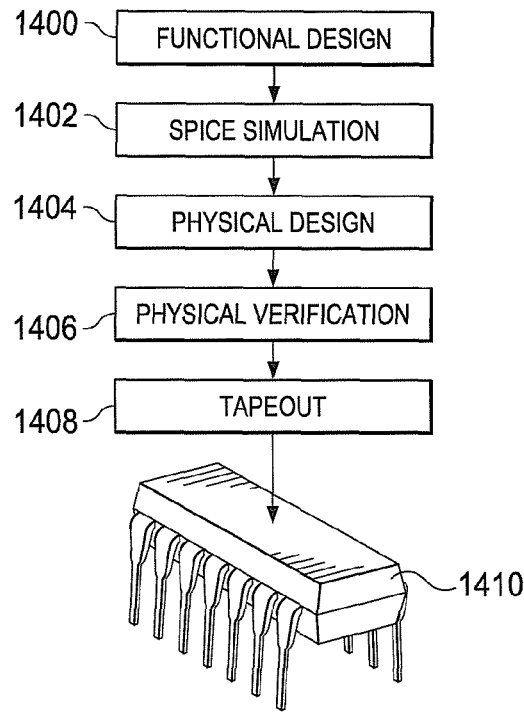
FIG. 14 illustrates a simplified ASIC design flow employing EDA tools for producing ASICs having embodiments of the present disclosure.

Reference is now made to FIG. 14 illustrating a simplified general ASIC design flow employing (EDA) tools for producing ASICs having embodiments of the present disclosure. At step 1400, the functional design of an ASIC which may include a VCO having a tapped inductor 600 in accordance with principles of the present disclosure is created.

For those portions of the ASIC digital in nature, the functional design is typically manifested by writing Register Transfer Level (RTL) code in a Hardware Descriptive Language (HDL) such as but not limited to, VHDL or Verilog. A functional verification (behavioral simulation) is then preferably performed on the HDL data structures to ensure the RTL design is in accordance with the logic specifications. Alternatively, a schematic of the digital logic can be captured with a schematic capture program.

For portions of the ASIC that are analog in nature (such as the VCO with a tapped inductor of the present disclosure), the analog functional design is typically manifested by capturing a schematic with a schematic capture program. The output of the schematic capture program is then converted (synthesized) into gate/transistor level netlist data structures.

At step 1402, the data structures are simulated with a simulation program with integrated circuits emphasis (SPICE). At step 1404, the data structures from step 1402 are instantiated with their geometric representations and the physical layout of the ASIC is performed.

The first step in physical layout is typically so-called "floor-planning" wherein gross regions on the integrated circuit chip are assigned and input/output (I/O) pins are defined. Hard cores (e.g. arrays, analog blocks, inductors, etc.) are placed within the gross regions based on the design constraints (e.g. trace lengths, timing etc.). Clock wiring (commonly referred to as clock trees) are placed and connections between gates/analog blocks are routed. When all the elements are placed, a global and detailed routing is running to connect all the elements together. Postwiring optimization is preferably performed to improve performance (timing closure), noise (signal integrity), and yield. The layout is modified, where possible, while maintaining compliance with the design rules set by the captive or external semiconductor manufacturing foundry of choice, to make it more efficient to produce. Such modifications may include adding extra vias or dummy metal/diffusion/poly layers.

At step 1406, the physical designed is verified. Design rule checking (DRC) is performed to determine whether the physical layout of the ASIC satisfies a series of recommended parameters i.e. design rules of the foundry. The design rules are a series of parameters provided by the foundry that are specific to a particular semiconductor manufacturing process. The design rules specify certain geometric and connectivity restrictions to ensure sufficient margins to account for variability in semiconductor manufacturing processes, to ensure that the ASICs work correctly. A layout versus schematic (LVS) check is preferably performed to verify the physical layout corresponds to the original schematic or circuit diagram of the design. A complete simulation is then preferably performed to ensure the layout phase is properly done.

After the layout is verified in step 1406, mask generation design data typically in the form of GDSII data structures is said to "tapeout" for preparation of photomasks at step 1408. The GDSII data structures are transferred through a communications medium (e.g. storage or over a network) from the circuit designer to either a photomask supplier/maker or directly to the semiconductor foundry.

At step 1410, the photomasks are created and used to manufacture ASICs in accordance with principles of the present disclosure.

Some of the techniques described herein can be implemented by software stored on one or more computer readable storage medium and executed on a computer. The selected techniques could be executed on a single computer or a computer networked with another computer or computers. For clarity, only those aspects of the tools or computer germane to the disclosed techniques are described. Product details well known in the art may be omitted.

Figure 15:
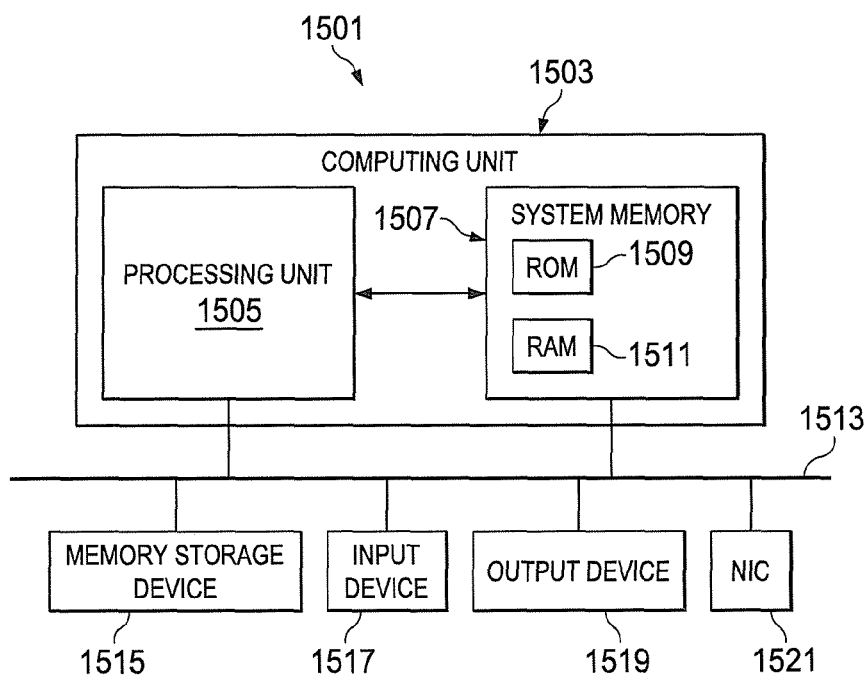
FIG. 15 illustrates an illustrative example of a computing device for practicing the design flow of FIG. 14.

FIG. 15 shows an illustrative example of a computing device 1501 for practicing the design flow of FIG. 15. As seen in FIG. 15, the computing device 1501 includes a computing unit 1503 with a processing unit 1505 and a system memory 1507. The processing unit 1505 may be any type of programmable electronic device for executing software instructions, but will conventionally be a microprocessor. The system memory 1507 may include both a read-only memory (ROM) 1509 and a random access memory (RAM) 1511. As will be appreciated by those of ordinary skill in the art, both the read-only memory 1509 and the random access memory 1511 may store software instructions for execution by the processing unit 1505.

The processing unit 1505 and the system memory 1507 are connected, either directly or indirectly, through a bus 1513 or alternate communication structure, to one or more peripheral devices. For example, the processing unit 1505 or the system memory 1507 may be directly or indirectly connected to one or more additional memory storage devices 1515. The memory storage devices 1515 may include, for example, a "hard" magnetic disk drive, a solid state disk drive, an optical disk drive, and a removable disk drive. The processing unit 1505 and the system memory 1507 also may be directly or indirectly connected to one or more input devices 1517 and one or more output devices 1519. The input devices 1517 may include, for example, a keyboard, a pointing device (such as a mouse, touchpad, stylus, trackball, or joystick), a scanner, a camera, and a microphone. The output devices 1519 may include, for example, a display device, a printer and speakers. With various examples of the computing device 1501, one or more of the peripheral devices 1515-1519 may be internally housed with the computing unit 1503. Alternately, one or more of the peripheral devices 1515-1519 may be external to the housing for the computing unit 1503 and connected to the bus 1513 through, for example, a Universal Serial Bus (USB) connection or a digital visual interface (DVI) connection.

With some implementations, the computing unit 1503 may also be directly or indirectly connected to one or more network interfaces cards (NIC) 1521, for communicating with other devices making up a network. The network interface cards 1521 translate data and control signals from the computing unit 1503 into network messages according to one or more communication protocols, such as the transmission control protocol (TCP) and the Internet protocol (IP). Also, the network interface cards 1521 may employ any suitable connection agent (or combination of agents) for connecting to a network, including, for example, a wireless transceiver, a modem, or an Ethernet connection.

It should be appreciated that the computing device 1501 is illustrated as an example only, and it not intended to be limiting. Various embodiments of the invention may be implemented using one or more computing devices that include the components of the computing device 1501 illustrated in FIG. 15, or which include an alternate combination of components, including components that are not shown in FIG. 15. For example, various embodiments of the invention may be implemented using a multi-processor computer, a plurality of single and/or multiprocessor computers arranged into a network, or some combination of both.

Although features and elements are described above in particular combinations, each feature or element can be used alone without the other features and elements or in various combinations with or without other features and elements.

Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

While this disclosure has described certain embodiments and generally associated methods, alterations and permutations of these embodiments and methods will be apparent to those skilled in the art. In particular, it should be noted that while the present disclosure has been described in the context of CMOS amplifiers, those skilled in the art will recognize application to PMOS and NMOS amplifiers, bipolar amplifiers, and other suitable topologies without departing from the scope of the present disclosure. The present disclosure has application to virtually all communications systems. For example, it may be used in cellular transceivers, 2-way radio communications, Wi-Fi applications, satellite receivers, and any application that uses a voltage controlled oscillator. Accordingly, the above description of example embodiments does not define or constrain this disclosure. Other changes, substitutions, and alterations are also possible without departing from the spirit and scope of this disclosure, as defined by the following claims.

What is claimed is:

1. A voltage controlled oscillator comprising:
   a resonator having a capacitive element and an inductive element, the inductive element having a plurality of conductive segments forming a physical loop defining an interior, the inductive element having a plurality of electrical connections coupled to a corresponding plurality of inductive loops disposed on the interior of the physical loop; and
   a differential amplifier having an input and an output, the input coupled to a first pair of the plurality of conductive segments, forming a first impedance, and the output coupled to at least two of the plurality of inductive loops that are disposed on the interior of the physical loop, forming a second impedance.

2. The voltage controlled oscillator of claim 1, wherein the at least two inductive loops are symmetrically disposed within the interior space formed by the physical loop.

3. The voltage controlled oscillator of claim 1, wherein the amplifier has an input voltage larger than an output voltage determined by a voltage divider formed by the first and second impedances.

4. The voltage controlled oscillator of claim 3, wherein the input voltage exceeds a supply voltage of the amplifier.

5. The voltage controlled oscillator of claim 1, wherein the at least one electrical loop is thinner than the physical loop.

6. The voltage controlled oscillator of claim 1, wherein the first impedance is proportional to the second impedance.

7. The voltage controlled oscillator of claim 1, wherein the amplifier has a CMOS topology.

8. The voltage controlled oscillator of claim 1, wherein the amplifier has a differential output.

9. The voltage controlled oscillator of claim 1, wherein the amplifier has a single ended output.

10. The voltage controlled oscillator of claim 1, wherein the physical loop is symmetrically shaped.

11. The voltage controlled oscillator of claim 10, wherein the physical loop has a substantially octagonal shape.

12. A semiconductor manufacturing device, comprising:
    a processor controlled semiconductor manufacturing device;
    a non-transitory memory storage comprising computer instructions and photomask data for making a voltage controlled oscillator; and
    one or more processors in communication with the processor controlled semiconductor manufacturing device and to the memory, wherein the one or more processors execute the computer instructions to make a voltage controlled oscillator comprising:
    a resonator having a capacitive element and an inductive element, the inductive element having a plurality of conductive segments forming a physical loop, the inductive element having a plurality of inductive electrical connections disposed in the interior of the physical loop; and
    an amplifier having an input and an output, the input coupled to a first conductive segment at a first pair of the plurality of conductive segments, forming a first impedance, and the output coupled to a first pair of the plurality of electrical connections, forming a second impedance.

13. The non-transitory computer-readable medium of claim 12, wherein the plurality of electrical connections form two electrical loops that are symmetrically disposed within the interior space formed by the physical loop.

14. The non-transitory computer-readable medium of claim 12, wherein the amplifier has an input voltage larger than an output voltage determined by a voltage divider formed by the first and second impedances.

15. The non-transitory computer-readable medium of claim 14, wherein the input voltage exceeds a supply voltage of the amplifier.

16. The non-transitory computer-readable medium of claim 12, wherein the at least one electrical loop is thinner than the physical loop.

17. The non-transitory computer-readable medium of claim 12, wherein the first impedance is proportional to the second impedance.

18. The non-transitory computer-readable medium of claim 12, wherein the amplifier has a CMOS topology.

19. The non-transitory computer-readable medium of claim 12, wherein the amplifier has a differential output.

20. The non-transitory computer-readable medium of claim 12, wherein the amplifier has a single ended output.

21. The non-transitory computer-readable medium of claim 12, wherein the physical loop is symmetrically shaped.

22. The non-transitory computer-readable medium of claim 21, wherein the physical loop has a substantially octagonal shape.

* * * * *